Feb. 25, 1958  W. F. HOLIN  2,824,624
CLASP BRAKE RIGGING
Filed July 19, 1954  3 Sheets-Sheet 1
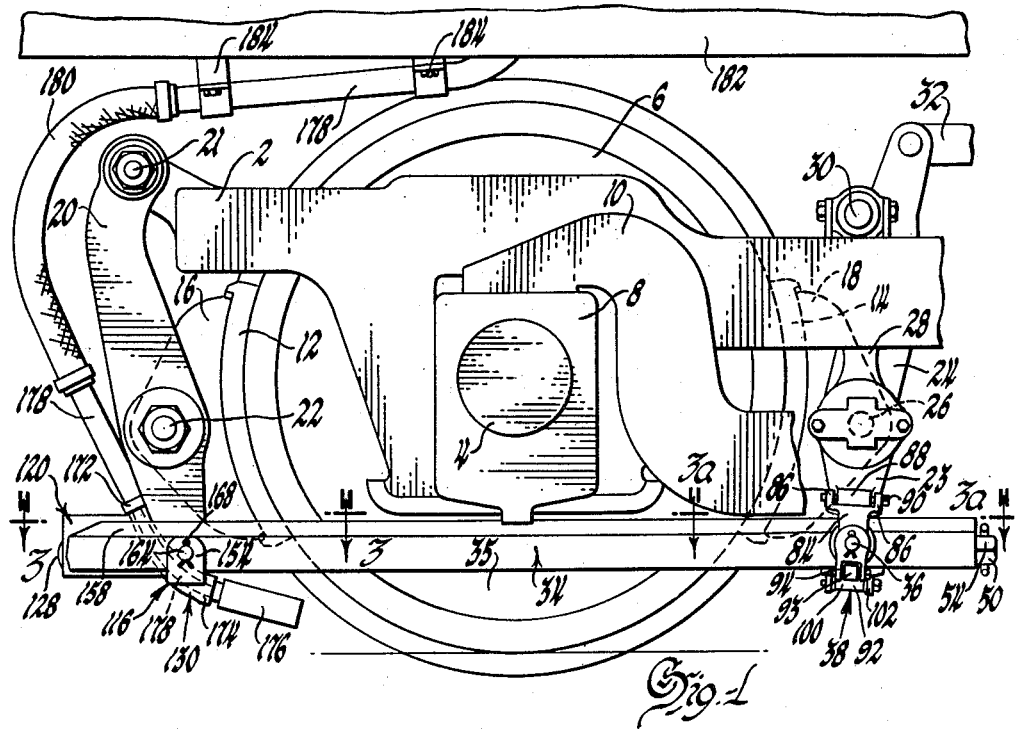
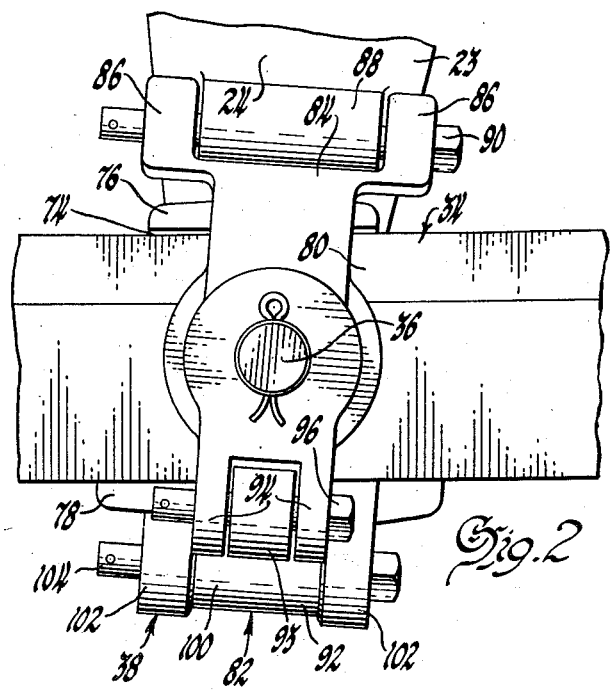
INVENTOR
William F. Holin
BY J. C. Thorpe
ATTORNEY

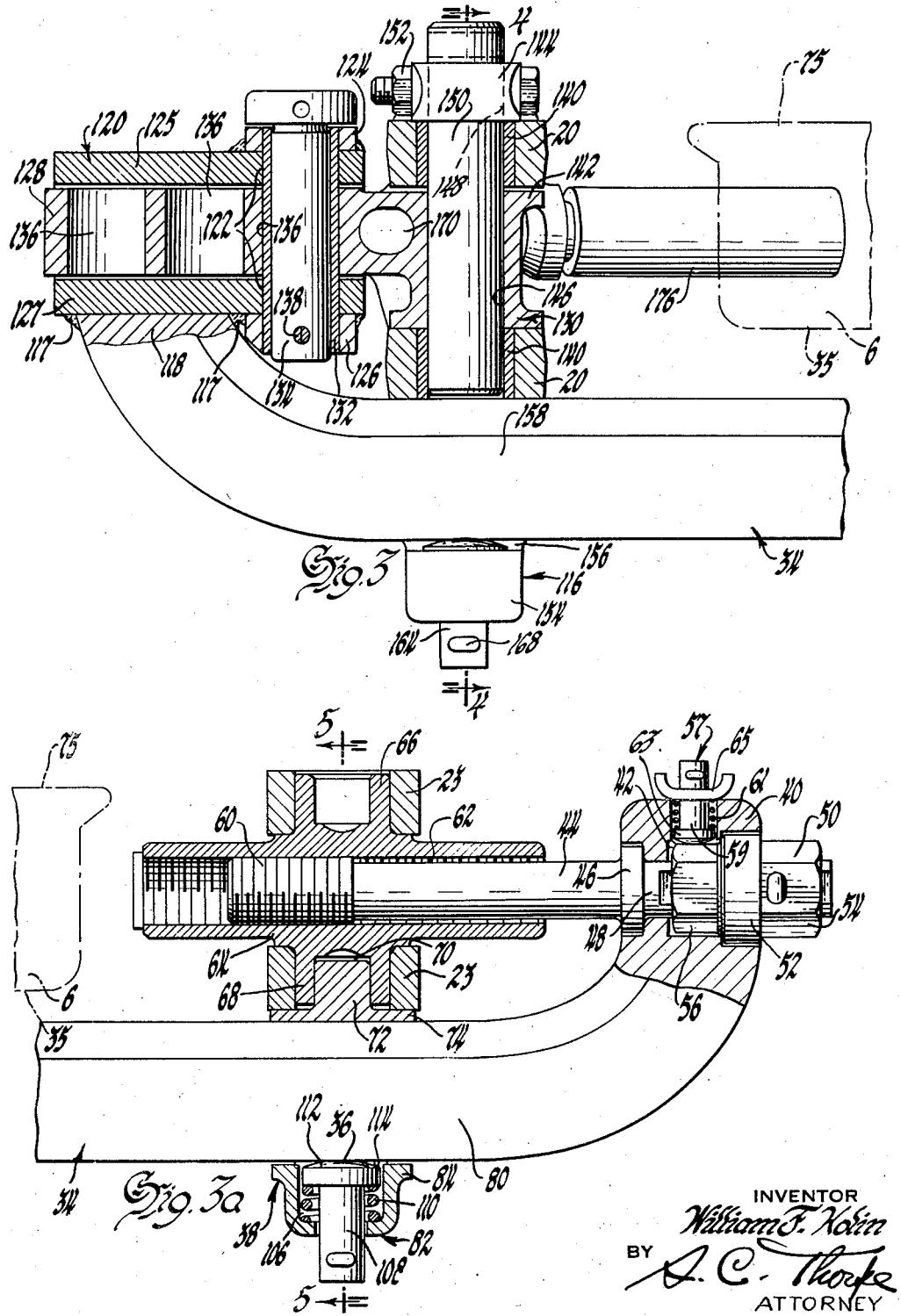

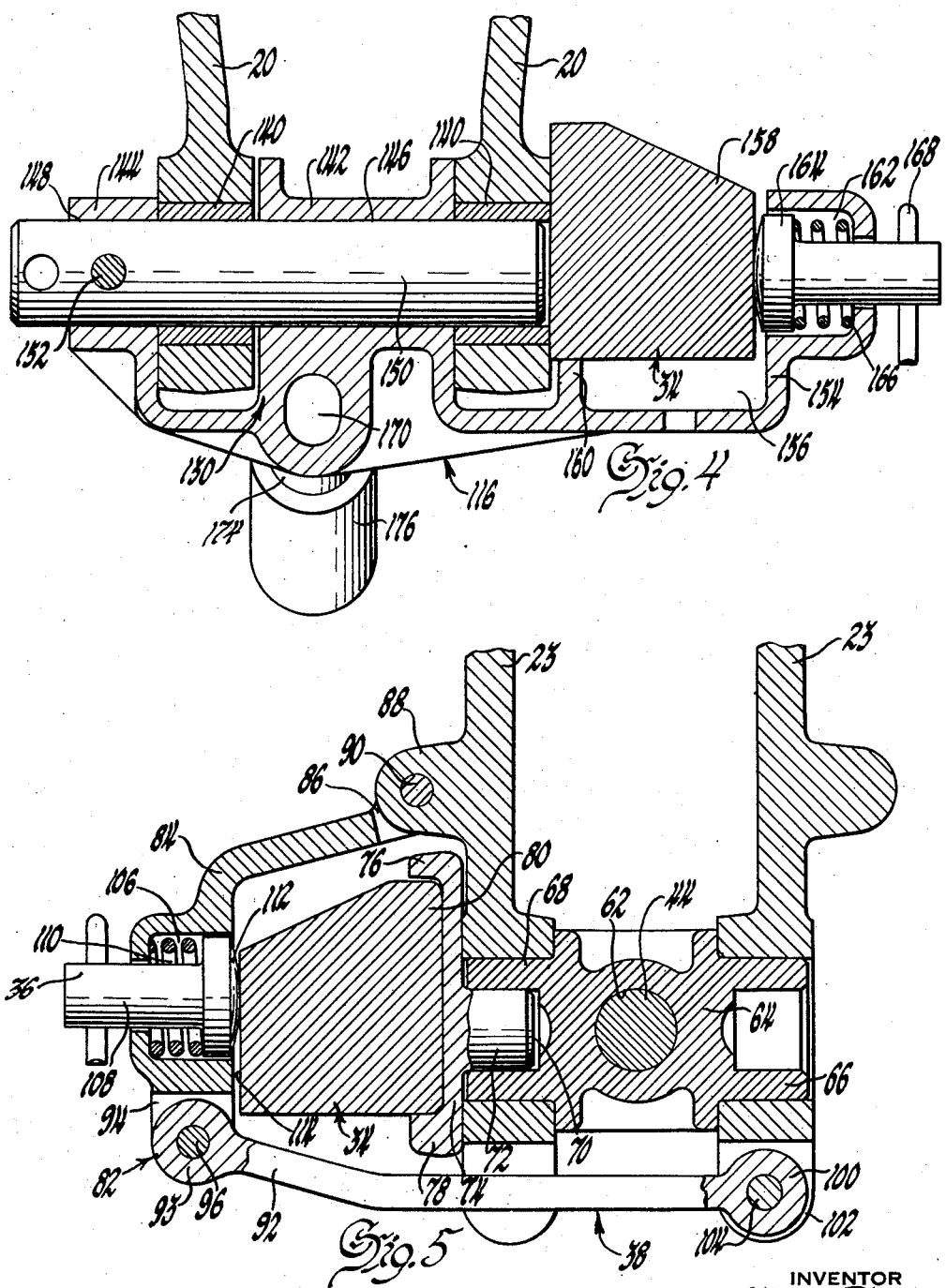

United States Patent Office 2,824,624
Patented Feb. 25, 1958

2,824,624

CLASP BRAKE RIGGING

William F. Holin, Riverside, Ill., assignor to General Motors Corporation, Detroit, Mich., a corporation of Delaware Application July 19, 1954, Serial No. 444,243

2 Claims. (Cl. 188—56)

This invention relates generally to brake rigging for railway vehicles and more particularly to a clasp type brake rigging in which a single horizontal tension bar is used to connect the lower ends of the verical live and dead brake levers whereby additional space is provided adjacent the inside face of the wheel for increasing the size of the traction motors and housings and appurtenances attached thereto.

It is an object of this invention to provide a novel clasp brake rigging for a railway vehicle which utilizes a single horizontal tension bar and unique means for connecting the lower ends of the live and dead brake levers thereto to improve and simplify the rigging and to relieve that space immediately inboard of the inner face of the wheel of brake rigging which might otherwise interfere with the larger size traction motors, traction motor housings and other appurtenances attached thereto resulting from substantial increases in the horsepowers of these vehicles.

For other objects of this invention reference may be had to the accompanying detailed description and drawings, in which:

Fig. 1 is a general side view in elevation of the new brake rigging supported on a railway vehicle truck.

Fig. 2 is an enlarged view of the means pivotally attaching one end of the horizontal tension bar to the lower end of the vertical live brake lever showing certain details thereof.

Fig. 3 is an enlarged view taken on the line 3—3 of Fig. 1 and having portions broken away and partly in section to show details of the means pivotally connecting an end of the horizontal tension bar to the vertical dead brake lever.

Fig. 3a is an enlarged view taken on the line 3a—3a of Fig. 1 and partly in section showing details of the means pivotally connecting an end of the horizontal tension bar to the vertical live brake lever. Fig. 3a includes certain details of a novel means for taking up the slack between wheel and shoes as they wear.

Fig. 4 is a view taken on the line 4—4 of Fig. 3 and further illustrates certain details of the novel means pivotally connecting an end of the horizontal tension bar to the vertical dead brake lever.

Fig. 5 is a view taken on the line 5—5 of Fig. 3a and further illustrates the novel means for pivotally connecting an end of the horizontal tension bar to the lower end of the vertical live brake lever. Fig. 5 also illustrates certain details of the novel slack adjusting means.

Referring to the accompanying drawings the reference numeral 2 indicates the frame of a railway vehicle truck in which the axle 4 carrying the wheels 6 is journalled in the usual manner in journal boxes 8. The reference character 10 indicates an equalizer bar the ends of which rest on top of the journal boxes 8. The brake rigging shown is of the clasp type and comprises brake shoes 12 and 14 adapted to be forced against the opposite sides of the wheels 6. The shoes 12 and 14 are carried on brake heads 16 and 18, respectively. The brake head 16 is pivotally mounted at the point 22 between a pair of vertical dead rake levers 20 pivotally supported on the frame 2 at 21. The brake head 18 is pivotally mounted between outboard and inboard bifurcations 23 of a vertical live brake lever 24 at the point 26 and is pivotally supported at point 26 by a pair of hangers 28 which are pivotally secured to the truck frame 2 at 30. Operatively connected to the upper end of the vertical live brake lever 24 is an operating rod 32 which is operatively connected to a brake cylinder (not shown) for actuation thereby.

Connected to the lower ends of the vertical dead brake lever 20 and vertical live brake lever 24 is a unique horizontal tension bar 34 comprising a single horizontally disposed bar located adjacent the outer face 35 of wheel 6. The horizontal tension bar 34 is attached to the lower end of the vertical live brake lever 24 at 36 by means indicated generally by a numeral 38. The means 38 is more particularly shown in Figs. 2, 3a and 5.

Referring to these latter figures it will be noted that the end 40 of the horizontal tension bar 34 adjacent the means 38 is bent inwardly or formed so that it extends through and is perpendicular to the plane of wheel 6. The end 40 is provided with a hole 42 of variable diameter for the reception of a slack adjusting bolt 44. The slack adjusting bolt 44 is provided with a flange 46 intermediate the ends thereof. On the right-hand side of flange 46 as viewed in Fig. 3a is a shank 48 which is threaded and has screwed thereon a slack adjusting bolt head 50. The slack adjusting bolt head 50 has a circular flange 52 intermediate the ends thereof enabling the bolt head 50 to be rotated in hole 42. On either side of flange 52 bolt head 50 is provided with hexagonal portions 54 and 56, the hexagonal portion 54 being for the purpose of applying a suitable tool to rotate head 50 and bolt 44. The hexagonal portion 56 is used to maintain the slack adjusting bolt and head in whatever position it is turned to by spring detent means 57 which engage the flat surfaces thereof. The spring detent means 57 include a plunger 59 loaded by a spring 61 acting between the head 63 of the plunger 59 and a small plate 65 tack welded or otherwise suitably secured to the end 40. The flanges 46 and 52 are provided for the purpose of retaining the slack adjusting bolt 44 and bolt head 50 in the hole 42. The left-hand threaded end 60 of slack adjusting bolt 44 as viewed in Fig. 3a extends into a threaded passage 62 in a slack adjusting nut 64. The slack adjusting nut 64 is provided with hollow trunnions 66 and 68 which are embraced in holes in the lower ends of the bifurcations 23 of vertical live brake lever 24. Extending into the bore 70 of hollow trunnion 68 is a cylindrical projection 72 formed on a plate 74 which in turn has thickened projecting flanges 76 and 78 adapted to partially embrace and support a portion 80 of the horizontal tension bar adjacent the end 40 thereof. The portion 80 is maintained in engagement with the plate 74 between the thickened flanges 76 and 78 by a strap assembly indicated generally by a numeral 82. The strap assembly 82 includes an upper strap 84 having its upper end formed with bifurcations 86 which are connected by a pin 90 to a boss 88 provided on the outboard bifurcation 23 of vertical live brake lever 24 above the lower end thereof. The strap assembly 82 also includes a lower strap 92 having a bossed end 93 connected by a pin 96 between bifurcations 94 provided on the lower end of strap 84. Strap 92 is provided with a second bossed end 100 which is connected by a pin 104 between bifurcations 102 on the lower end of the inboard bifurcation 23 of the vertical live brake lever 24.

A recess or pocket 106 is provided in the strap 84 and contains a plunger 108 which is loaded by means of a helical spring 110 so that the face 112 of plunger 108 engages the outboard surface 114 of portion 80 and holds it in engagement with the plate 74.

It will be noted from the foregoing description that a novel and superior pivoting construction is provided between the horizontal tension bar 34 and the vertical live brake lever 24 which eliminates any brake rigging adjacent or inboard of the inner face 75 of the wheel 6 thereby increasing the room available for traction motor, traction motor housings and appurtenances attached thereto. It will also be observed that this unique means for attaching this horizontal tension bar 34 to the lower end of vertical live brake lever 24 eliminates rattling and play therebetween due to the anti-rattling plunger 108 and, additionally, provides a simplified but improved novel slack adjusting means.

Referring now more particularly to Figs. 3 and 4 it will be observed that new and unusual means indicated generally by the numeral 116 have been provided for connecting the lower ends of the dead brake levers 20 to the opposite end 118 of the horizontal tension bar 34. The end 118 is also generally formed so that it is at right angles to the plane of wheel 6 and extends therethrough.

Welded or otherwise suitably secured at 117 to the end 118 of horizontal tension bar 34 is an inverted U-shaped channel member 120. The U-shaped channel member 120 is provided with aligned holes or openings 122 which are further defined by washers 124 and 126 secured thereabout. Extending between the legs or flanges 125, 127 of U-shaped member 120 is an appendage 128 of a member 130. The appendage 128 of member 130 may be adjustably secured in the channel member 120 by means of a bushing 132 and a pin 134 extending through holes 122 and any one of a plurality of holes 136 provided in the appendage 128. To prevent the loss of bushing 132 and pin 134 from the holes 122 and a hole 136 a cotter pin 138 extending through holes therein has been provided.

It will be observed that the lower ends of the inboard and outboard vertical dead brake levers 20 are provided with holes therein in which are positioned bushings 140. Interposed between the lower ends of the vertical dead brake levers 20 is a second appendage 142 on the member 130. A third appendage 144 is provided on member 130 and is located inboard of the lower end of the inboard vertical dead brake lever 20. The appendages 142 and 144 are provided with holes 146 and 148, respectively, in alignment with each other, these holes being used to pivotally connect the member 130 to the lower ends of the vertical dead brake levers 20 by means of a pin 150 extending therethrough and through the bushings 140. Pin 150 is retained in the holes 146, 148 and bushings 140 by means of a bolt and nut assembly 152 wherein the shank of the bolt extends through holes in the appendage 144 and pin 150.

The member 130 is provided with a fourth appendage 154 which in combination with the lower end of the outboard vertical dead brake lever 20 defines a pocket 156 in which a portion 158 of the horizontal tension bar 34 resides. It will be noted that the bar is partially supported on a flange 160 located in the pocket 156. The appendage 154 of member 130 is provided with a recess or pocket 162 in which is positioned a plunger 164 loaded by a spring 166 extending between the head of plunger 164 and the bottom of pocket 162. The plunger 164 serves the purpose of maintaining the portion 158 of horizontal tension bar 34 in close contact with the outboard vertical dead brake lever 20 and prevents play and rattling therebetween. To prevent loss of plunger 164 a cotter pin 168 is provided which extends through a suitable hole in the outer end of the shank thereof.

It will be noted particularly in Figs. 1, 3 and 4 that the member 130 is provided with a passage 170 whose entrance is defined by an inlet flange 172. The outlet of passage 170 is defined by an outlet flange 174. This passage is in the form of a smooth curve as may be appreciated from Fig. 1 and is so formed that it passes below the pin 150 with the pin located between passage 170 and wheel 6. By this construction sand may move in a smooth, unobstructed path down below pivot pin 150 and be directed by a suitable sander nozzle 176 to the rail immediately in front of the wheel where it is most effective. Sand is supplied to the sander nozzle 176 through passage 170 communicating with suitable piping 178 and flexible pipe conduit 180 attached to the underside of the locomotive body 182 by brackets 184.

It may now be appreciated that the vertical dead brake levers 20 are pivotally connected to a unique single horizontal tension bar by novel means which enable sand to be applied to the wheels in an improved manner, which allow for moderate adjustment of the brake shoes and heads to take up slack, and which eliminate any brake rigging adjacent or inboard of the inner face 75 of the wheel 6.

This unique clasp brake rigging represents a substantial improvement over prior clasp brake constructions by the elimination of noise, a substantial increase in the availability of space inboard the inner face of the wheels to be braked and simplified and improved slack adjusting means and sand applying means which are combined with unique and simplified pivoting means for connecting the ends of the horizontal tension bar to the vertical brake levers.

The operation of the clasp brake rigging is accomplished by movement of the operating rod 32 to the left as viewed in Fig. 1 by means of a brake cylinder (not shown). This movement of operating rod 32 will cause vertical live brake lever 24 to pivot counterclockwise about the point 36 until the brake shoe 14 engages the wheel 6. After the brake shoe 14 engages wheel 6 further counterclockwise pivotal movement of the lever 24 will take place about point 26 causing the horizontal tension bar 34 to move to the right as viewed in Fig. 1. Movement of horizontal tension bar 34 to the right causes vertical dead brake lever 20 to pivot counterclockwise about point 21 until brake shoe 12 engages wheel 6 at which time full clasp braking may be accomplished.

In order to take up the slack which occurs in this type of brake rigging upon wear of the wheel 6 and the brake shoes 12 and 14 it is merely necessary to apply a suitable tool to the hexagonal portion 54 and turn the slack adjusting bolt 44 in a direction which will cause the slack adjusting nut 64 to move further away from the end of the horizontal tension bar 40. This will move the lower end of the vertical live brake lever 24 and the brake head 18 into closer proximity to the wheel 6. As already mentioned, the plunger 59 by means of its head engaging a flat surface on the hexagonal portion 56 maintains the slack adjusting bolt 44 in the position to which it has been turned.

It may be that larger adjustments are needed in applying the clasp brake rigging to various size truck wheels. In this instance, the adjustments are readily made by selecting a hole 136 which will give the desired clearance between the brake shoes and the wheel to be braked and inserting therethrough and through holes 122 the bushing and pins 132 and 134, respectively.

Sand may be applied through the piping 178 and flexible conduit 180 through the passage 170 and to the nozzle 176 from a suitable sandbox or other enclosure located in the locomotive body 182.

I claim:

1. In a clasp brake rigging for a wheel of a railway vehicle truck, a vertical live brake lever and a vertical dead brake lever operably supported by said truck on opposite sides of said wheel in the plane of said wheel, a single substantially horizontal tension bar having all portions thereof in a horizontal plane and having a longitudinal portion spaced laterally outwardly from and extending across an outer face of said wheel, said tension bar having the ends thereof turned to extend inwardly through and substantially at right angles to the plane of said wheel and means pivotally fastened to the lower ends of said levers and supporting the ends of said bar and said longitudinal portions adjacent the ends of said bar to stabilize said bar in its horizontal plane.

2. In a clasp brake rigging for a wheel of a railway vehicle truck, a vertical live brake lever and a vertical dead brake lever operably supported by said truck on opposite sides of said wheel in the plane of said wheel, a single horizontal tension bar having all portions thereof in a horizontal plane and having a longitudinal portion spaced laterally outwardly from and extending across an outer face of said wheel, said tension bar having the ends thereof turned to extend inwardly through and substantially at right angles to the plane of said wheel and means pivotally fastening said bar to said levers, said fastening means comprising a fastening member having at least four elements perpendicular to each other and lying substantially in the plane of said bar, two of said elements lying in the plane of said wheel and being connected to the ends of said bar and said levers, two others of said elements being perpendicular to the plane of said wheel and embracing portions of said bar spaced from said ends and being connected to said levers to stabilize said bar in its horizontal plane.

References Cited in the file of this patent

UNITED STATES PATENTS

| | | |
|---|---|---|
| 2,266,304 | Blomberg | Dec. 16, 1941 |
| 2,613,766 | Miers | Oct. 14, 1952 |